United State
Currie et al.

[11] 3,818,196
[45] June 18, 1974

[54] SURVEILLANCE COMPUTER

[75] Inventors: Richard W. Currie; Teddy J. Peacher, both of Huntsville, Ala.

[73] Assignee: The United States of America as represented by the Secretary of the Army, Washington, D.C.

[22] Filed: Dec. 21, 1972

[21] Appl. No.: 317,321

[52] U.S. Cl. ........ 235/150.27, 235/61.5 S, 235/164, 343/112 C
[51] Int. Cl. .......................... G06f 15/50, G01s 7/46
[58] Field of Search ....... 235/150.2, 150.27, 61.5 S; 89/41 L; 244/316; 250/344, 333, 342; 343/7 A

[56] References Cited
UNITED STATES PATENTS

| | | | |
|---|---|---|---|
| 3,614,438 | 10/1971 | Knowlden | 250/333 |
| 3,640,628 | 2/1972 | Jones | 89/41 L |
| 3,699,573 | 10/1972 | Andrews et al. | 343/7 A |
| 3,720,942 | 3/1973 | Wilmot et al. | 343/7 A |
| 3,721,977 | 3/1973 | Darboven | 343/7 A |

Primary Examiner—Felix D. Gruber
Attorney, Agent, or Firm—Edward J. Kelly; Herbert Berl; Glenn S. Ovrevik

[57] ABSTRACT

A surveillance computer maintains track simultaneously on a number of targets in the field of view of a surveillance device for enhancing initial detection and observation of aircraft targets. The computer is responsive to outputs from a surveillance device, such as an infrared scanning system. These outputs are repetitive electronic signals indicating that a target is present and provide the target's azimuth and elevation coordinates in digital format.

2 Claims, 3 Drawing Figures

SURVEILLANCE COMPUTER

SUMMARY OF THE INVENTION

With a repetitive scan infrared surveillance unit for detecting aircraft, the surveillance computer performs a track-while-scan of multiple targets within the field of view of the surveillance unit. Inputs to the computer indicate the presence and angular location of targets. The computer compares the angular position of a detected target with the angular position of previously detected targets stored in memory. When there is a target in memory with positional coordinates within preset angular limits of the detected target, a target association occurs and the memory location is updated to the new target position. If target associated does not occur the target information is entered into an inactive memory location as a new target. Repetitive targets which show no movement and targets which are no longer detected are dropped from memory, making room for new active targets.

DESCRIPTION OF THE PREFERRED EMBODIMENT

The surveillance computer is utilized in detecting and tracking aircraft and other targets in the field of view of an infrared surveillance unit. The computer operates in real time processing the incoming data for targets. Ready access to the computer memory simplifies output data display on a cathode ray tube device. Information from the computer can further be used to direct, aim, and fire close by defence weaponry, relieving the human operator of those functions or selected portions of them.

Figure 1:
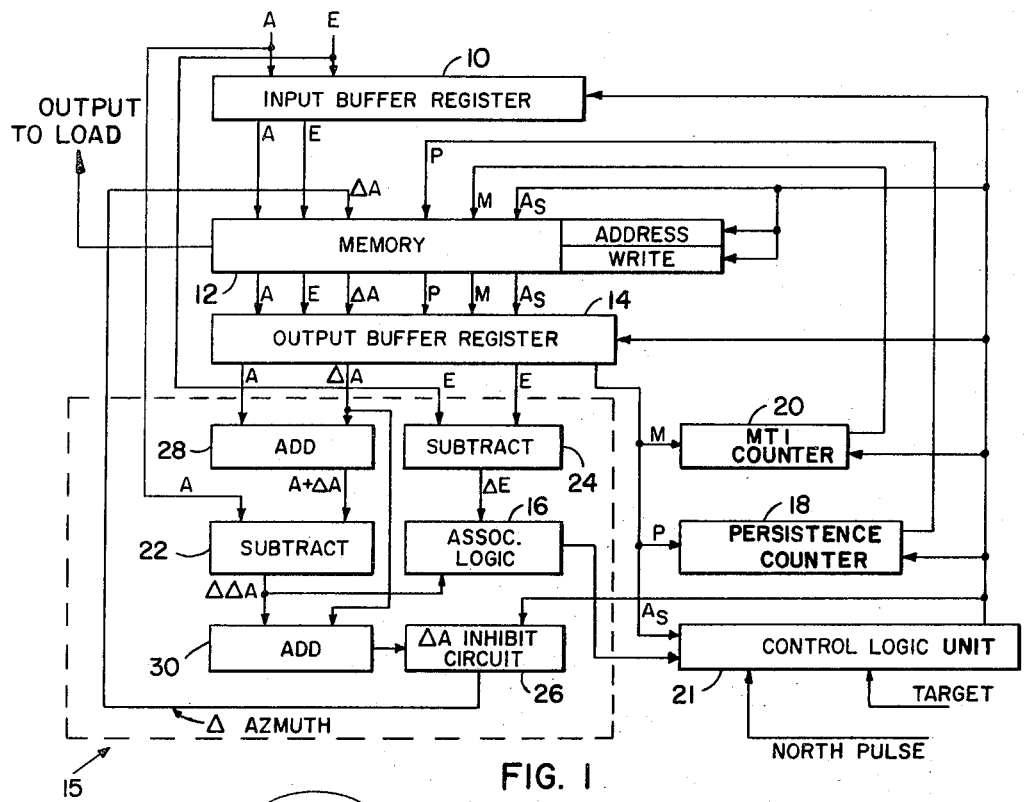
FIG. 1 is a block diagram of a preferred embodiment of the surveillance computer.

As shown in FIG. 1, the computer is comprised of an input buffer register 10 to receive target data, a 16 word 29 bit memory storage unit 12, an output buffer register 14, association logic network 15, target persistence update circuitry 18, a moving target indicator (MTI) and stationary target reject circuit 20 and an operation control logic unit 21.

At input buffer register 10 the computer receives a 13 bit word denoting azimuth position A and a 5 bit word denoting elevation position E from the surveillance unit. Azimuth position A is further coupled as an input to a subtract circuit 22 and elevation input E is further coupled to a subtract circuit 24 of logic network 15. These input word lengths can be changed, depending on the degree of resolution required or whether additional elevational detection channels are utilized. A and E outputs from buffer register 10 are coupled as inputs to memory 12.

Control logic unit 21 receives a north reset pulse input indicating the start of a new sweep, and a target pulse input denoting occurrence of a target from the related target surveillance head. Control output lines from logic unit 21 are coupled as inputs to buffer register 10, memory 12, output buffer register 14, MTI 20, persistence update circuitry 18, and azimuth inhibit circuit 26. An output from inhibit circuit 26 couples any change in azimuth ($\Delta A$) as an input to memory circuit 12. Similarly, a persistence output P from persistence circuit 18 is coupled as an input to memory circuit 12, and an output from moving target indicator 20 is coupled as an input M to memory circuit 12. On command, memory 12 outputs the respective inputs A, E, $\Delta A$, P and M to output buffer register 14 for distribution to the other computer elements as well as coupling desired outputs to display means or other using circuitry with methods well known in the art. Thus, A and $\Delta A$ are coupled through output buffer register 14 to an add circuit 28 of logic network 15. The summed output of add circuit 28 ($A + \Delta A$) is coupled as an input to subtract circuit 22. The output of subtract circuit 22 is a $\Delta \Delta A$ output indicative of any change in target velocity and is coupled as an input to association logic circuit 16 and as an input to an add circuit 30. The $\Delta A$ output of buffer register 14 is further coupled as an input directly to add circuit 30 for combining with $\Delta \Delta A$. The output of add circuit 30, which represents any change in azimuth of a target, is coupled as an input to inhibit circuit 26 for feeding back to memory circuit 12. The E output of buffer register 14 is coupled as an input to subtract circuit 24 for combining with appropriate incoming elevation signals E to provide a $\Delta E$ output. The $\Delta E$ output is coupled as an input to association logic circuit 16 and along with $\Delta \Delta A$ is coupled as an output to control logic circuit 21. Similarly P, M, and $A_s$ are coupled respectively as inputs to MTI circuit 20, persistence circuit 18 and control logic circuit 21. The $A_s$ (target association bit) input to memory circuit 12 is also directly coupled to the address and write control circuits of the memory.

Occurrence of a target pulse causes the azimuth, elevation, and intensity data present at input buffer register 10 to be loaded into the register. The control unit 21 cycles the computer memory and thereby causes the computer association logic 16 to compare the entering azimuth and elevation values automatically with those already in memory 12. During cycling each memory location is compared sequentially until association occurs or until all memory locations have been examined. If association does not occur the input information is entered as a new target. If the memory is full the new target is ignored. Association occurs in association logic ricuit 16 when the difference between the elevation and azimuth position value of the target being examined and the target stored in memory is less than a preselected value. These preselected values represent azimuth and elevation windows $A_d$ and $E_d$ which are entered by means of set switches within association logic circuit 16 establishing a binary word.

When association occurs the difference in azimuth $\Delta \Delta A$ between the memory positional data and the target positional data is utilized to predict where the target will be in azimuth on the next scan. The expected change in azimuth value is entered into the computer memory, which allows fly-by tracking of fast moving targets and still utilizes a relatively small association window.

On entering a new target the $\Delta A$ section in memory circuit 12 is set to zero. On first association with the target a true $\Delta A$ is established. which is used to predict the next appearance point of the target by adding it to the azimuth position entered into memory at the same time. This predicted position is compared to the following appearance position and the difference $\Delta \Delta A$, which may be caused by target acceleration or deceleration, is used to update the ΔA from memory circuit 12 by addition before entering it into memory. Thus, the ΔA section of the computer is continuously updated. Prediction of target position with respect to the elevation axis is implemented in a similar manner.

The appearance of a new target pulse input to control logic circuit 21 causes the control unit to attempt association sequentially with each memory location. When association does not occur the memory is searched for an available location to enter the new data as a new target. On entrance as a new target the Δ azimuth bits in memory are set to 0 by the ΔA inhibit circuit and the association bit set to 1. The moving target indicator, MTI, is set to 01.

The appearance of an update target pulse causes the control unit to attempt association sequentially with each memory location until association occurs. In checking for association, a memory location is established. The azimuth and Δ azimuth values are taken from memory and summed in one's complement adder circuit 28. The output of add circuit 28 is subtracted from the input target azimuth position A, which generates a difference value. The absolute value of this difference signal is compared in association logic circuit 16 with a previously established window limit to determine if azimuth association has occurred. The window limit is preset manually. If association did not occur in both azimuth and elevation, the memory location is unchanged and the computer increments to the next memory location. Association operations are then repeated on this new location. When association occurs the Δ azimuth value from memory is summed with the ΔΔ azimuth value and returned to memroy through the ΔA inhibit circuit. This updated Δ azimuth, an output of ΔA inhibit circuit 26, is entered into memory 12 along with the new azimuth and elevation positions. since association occurred the association bit is set to a 1 at this time. Also, the moving target indicator and stationary target reject circuit 20 utilizes two memory bits to determine if the target is moving. A two-bit counter within MTI 20 which has been set to the value of the MTI bits M1 and M2 in memory is incremented up for $|\Delta A| = S$ or set to 01 for $|\Delta A| > S$, where S is the MTI window limit, a value set in with limit switches or other means. The association of a non-moving target will cause this counter to imcrement up on association to 11 and then on the next association revert to the 00 condition. These updated moving target bits are entered into memory at each association. When the MTI 00 condition appears in memory for a location at the followihg north pulse memory update, the association bit and persistence bits are set to 0. This operation will clear this memory location for a new target next scan.

When a north reset pulse is received from the scanning unit by the computer, the computer examines each memory location and updates the persistent bits of persistence circuit 18 in accordance with the association logic bit state 16, sets the association bit to 0, and enters these values back into the memory. A logical 1 in the association bit indicates that target data was entered or updated during the previous scan, a logical 0 indicates no association. To update the persistence bits a counter is set to the persistence bit values from memory. The counter (not shown) is incremented up for an association bit value of 1 and down for a value of 0. This counter operates over the range from 00 to 11, the up 11 to 00 and down 00 to 11 transitions are forbidden. Logical zeros in the association bit and both persistence bits indicate the memory location is available for entering the new target.

Thus, occurrence of the north pulse causes the control unit to step through memory 12 target locations and update the persistence 18 bits. Two memory bits are utilized for persistence information. One bit denotes target association. This association bit is set to 1 when a target is associated or entered during the azimuth scan. This logical one blocks further target association in the particular memory location during the remainder of the azimuth scan. On occurrence of the north pulse, for an existing logical one in this location on persistence update, the two bit counter increments upward. The counter is preloaded with the persistence value from memory 12. The output of this counter as new persistence data P from persistence circuit 18 is entered in the memory 12. The logical 0 in the association bit denotes absence of association on the previous azimuth scan. During the north pulse update a logical 0 is entered in the association bit memory location.

Figure 2:
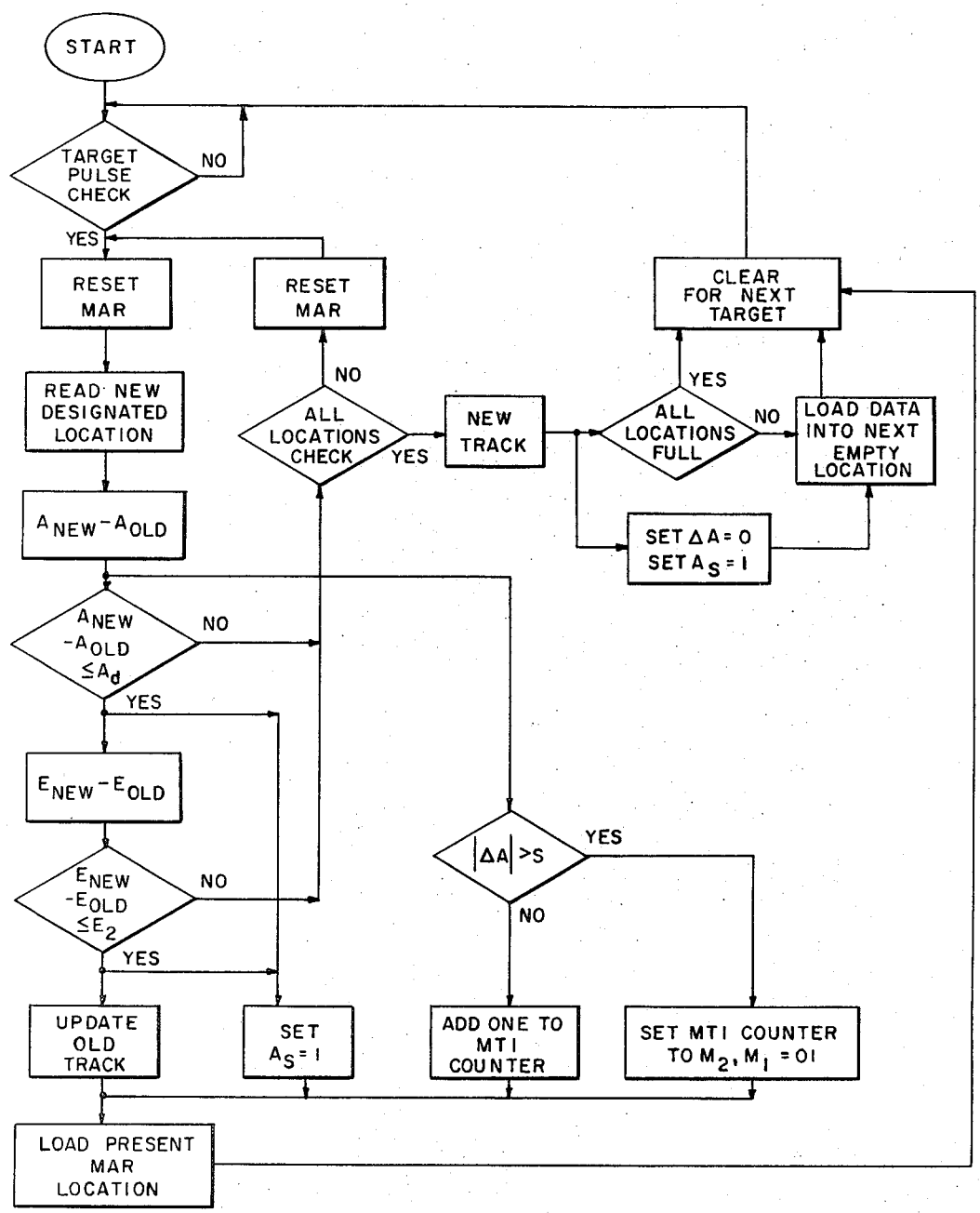
FIG. 2 is a system flow chart for processing a target in the apparatus of FIG. 1.

Processing of a particular target signal is as shown in FIG. 2. Receipt of a north reset pulse initiates target processing. The computer checks to see if a target pulse has been received. If no pulse has been received the system resets, if a pulse has been received the addres register of the memory is engaged and the memory is searched. The new designated location of the target in azimuth is compared with the original of preceding azimuth position to provide a difference signal. If this difference signal is greater than the azimuth window $A_d$, the memory address register is stepped to the next address until all locations have been checked. If all target locations in the computer have been checked a new target is indicated. The memory is then searched to see if all target positions of the memory are full. If the positions are full the computer is cleared for receipt of a new target signal, if not full the received data is logged into the next empty location and the computer is then cleared for receipt of a new target signal. When the azimuth difference signal is less than $A_d$, the new elevation and old elevation signals are compared and subtracted to provide a difference signal, and $A_s$ is set to 1 if the differential elevation signal is less than the elevation window gate. When the elevation differential signal is greater than the elevation window control, the computer address register is again stepped through succeeding target locations in a similar manner as with the differential azimuth signal. For a differential elevation signal less than or equal to the elevation window the information is entered in the memory to update the old tracking data. The data is loaded into the present memory address register location and the computer is cleared for receipt of the next target signal.

When the old azimuth signal is subtracted from the new azimuth signal to provide the differential azimuth output signal, the absolute value of this difference signal is compared with the moving target indicator window limit S. If this absolute value of ΔA is greater than S, the MTI counter bits are set equal to 01. If the absolute value of ΔA is less than S, 1 is added to the MTI counter. This updated data is loaded into the memory address register (MAR). The MTI value of 00 is used to clear the memory location on the next north pulse memory update.

Figure 3:
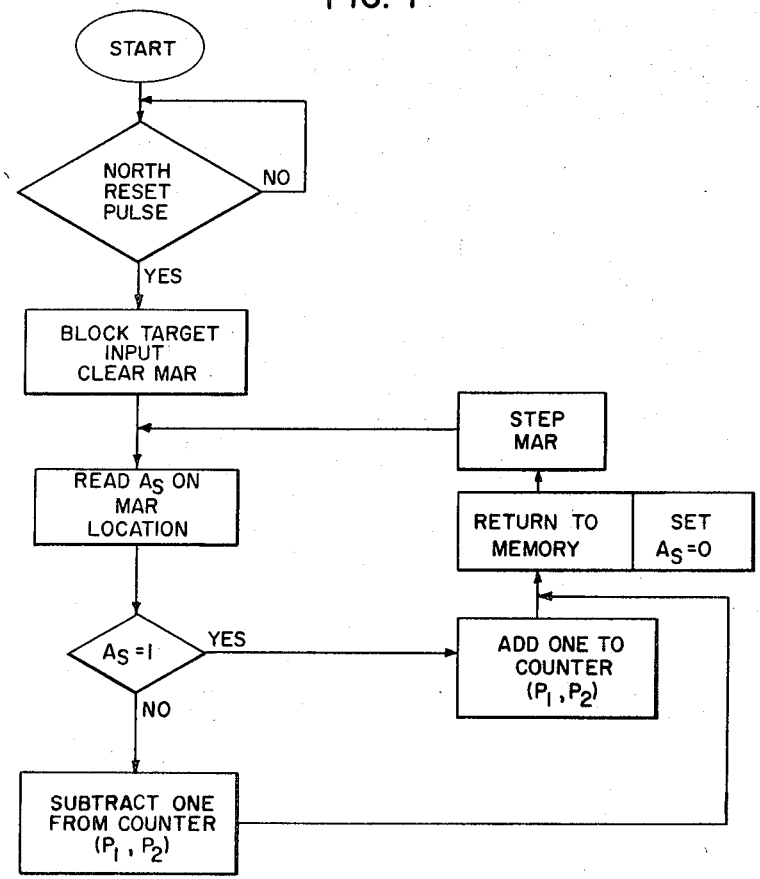
FIG. 3 is a flow chart of the presistence update circuitry of FIG. 1.

As shown in FIG. 3 the north pulse input is used to update persistence. If any preceding north pulse updates have not been reset the sequence will not start until reset has occured. On reset of any preceding north pulses, a current north pulse results in the control logic circuit blocking a target input signal and clearing the memory address register. The association bit $A_s$ for the particular memory address register location is obtained. If $A_s$ is a logical zero or does not equal 1, a signal is generated telling the persistence circuit counter to subtract 1. If $A_s = 1$ the persistence counter is told to add 1. Adding or subtracting these one bits (P1 and P2) sets the association bit to zero and indicates a logic zero in the association bit returned to memory circuit 12, which steps the memory address register to the next location.

While the invention has been described with reference to a preferrred embodiment thereof, it will be apparent that various modifications and other embodiments thereof will occur to those skilled in the art within the scope of the invention. Accordingly, the scope of the invention should be limited only by the claims appended hereto.

We claim:

1. In a target tracking system wherein energy is received from plural moving targets for processing by a surveillance tracking station for providing target azimuth and elevation data, the improvement of a surveillance computer, for providing plural target tracking and scanning data, and comprising: a memory storage unit for receiving and storing input data thereto and for coupling data output therefrom, said memory unit having plural inputs including a gating input and plural outputs; an input buffer register having first and second inputs for receiving input azimuth and elevation signals respectively, a gating input, and first and second outputs for coupling said azimuth and elevation signals to respective first and second inputs of said memory unit plural inputs; an output buffer register having plural inputs coupled to respective plural outputs of said memory unit, said plural memory outputs to said output buffer being signal bits corresponding respectively to azimuth, elevation, target persistance, moving target indication, and memory association data, and said output buffer also having a gating input and plural outputs; a target persistence circuit having a first input coupled to a first output of said output buffer, a gating input, and an output coupled as a third input of said memory for updating target persistence data in the memory; a moving target indicator having a first input coupled to a second output of said output buffer, a gating input, and an output coupled as a fourth input of said memory for updating memory data indicative of presence or absence of a moving target; a control logic unit having a reset input, a target presence input, and plural outputs for controlling sequence of operation of the computer in response to input signals thereto, said control unit having a first output coupled as said gating input to said input buffer register, a second output coupled as said gating input to said memory, a third output coupled as a gating input to said output buffer, a fourth output coupled to said gating input of said moving target indicator, and a fifth output coupled as said gating input to said target persistence circuit for gating said circuits at preselected time intervals and thereby cycle said computer to provide said plural target tracking and scanning data; and an azimuth and elevation association logic network having first and second inputs coupled in parallel respectively with said input buffer register azimuth and elevation inputs, a first output coupled as a fifth input to said memory for coupling changes in azimuth thereto, and a second output coupled to said control logic unit to indicate occurrence of association between instant received signals and related memory signals for associated targets, said azimuth and elevation association logic network including first and second add circuits each having first and second inputs and an output; a first subtract circuit; and an azimuth inhibit circuit having first and second inputs and an output; said subtract circuit being responsive to said first or azimuth input; the output of said first add circuit being coupled as an input to said subtract circuit; the first inputs of said first and second add circuits being connected in parallel for receiving identical input signals; an output of said subtract circuit being coupled as said second input to said second add circuit; said second add circuit output being coupled as said first input to said azimuth inhibit circuit, said second inhibit circuit input being responsive to a control output from said control logic unit, the output of said inhibit circuit being coupled to said memory for coupling changes in azimuth thereto; and wherein said output buffer register has changes in azimuth and azimuth data output bits coupled as respective first and second inputs of said first add circuit.

2. In a target tracking system wherein energy is received from plural moving targets for processing by a surveillance tracking station for providing target azimuth and elevation data, the improvement of a surveillance computer, for providing plural target tracking and scanning data, as set forth in claim 1 wherein said azimuth and elevation association logic network further comprises a second subtract circuit having a first input responsive to said input buffer register elevation input, a second input coupled to said output buffer register for receiving memory elevation data bits therefrom, and a differential output for coupling out changes in elevation data; and an association logic circuit having first and second inputs and an output, said first input being responsive to said second subtract circuit differential output, said second input being responsive to the output of said first subtract circuit, and said logic output being coupled as an input to said control logic circuit for indicating association between received target bits.

* * * * *